US007054020B2

(12) United States Patent
Gassho et al.

(10) Patent No.: US 7,054,020 B2
(45) Date of Patent: May 30, 2006

(54) PRINT JOB MANAGEMENT SYSTEM

(75) Inventors: Kazuhito Gassho, Nagano-ken (JP);
Yasushi Nakaoka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 876 days.

(21) Appl. No.: 09/767,223

(22) Filed: Jan. 23, 2001

(65) Prior Publication Data

US 2001/0022668 A1  Sep. 20, 2001

(30) Foreign Application Priority Data

Jan. 24, 2000  (JP) ............................. 2000-013657

(51) Int. Cl.
*G06F 15/00* (2006.01)
*G06K 1/00* (2006.01)

(52) U.S. Cl. ..................... 358/1.15; 358/1.1; 358/1.16; 400/76

(58) Field of Classification Search ...... 358/1.11–1.15, 358/1.9, 1.1, 1.16, 400, 404, 444, 500, 523; 400/62, 76
See application file for complete search history.

(56) References Cited

U.S. PATENT DOCUMENTS

| 5,787,237 | A | | 7/1998 | Reilly | |
|---|---|---|---|---|---|
| 5,898,823 | A | * | 4/1999 | Sorkin et al. | ............... 358/1.15 |
| 6,401,150 | B1 | * | 6/2002 | Reilly | ......................... 710/104 |
| 6,476,930 | B1 | * | 11/2002 | Roberts et al. | ............. 358/1.18 |
| 6,618,163 | B1 | * | 9/2003 | Roosen et al. | ............. 358/1.15 |
| 6,665,724 | B1 | * | 12/2003 | Lawrence | .................... 709/230 |
| 2002/0089695 | A1 | * | 7/2002 | Kubota | ....................... 358/1.16 |

FOREIGN PATENT DOCUMENTS

| EP | 820004 A1 * | 1/1998 |
|---|---|---|
| JP | 5-313839 | 11/1993 |
| JP | 6-149495 | 5/1994 |
| JP | 6-149501 | 5/1994 |
| JP | 11-20274 | 1/1999 |
| JP | 11-154065 | 6/1999 |

* cited by examiner

*Primary Examiner*—Gabriel Garcia
*Assistant Examiner*—Thierry L. Pham
(74) *Attorney, Agent, or Firm*—Oblon, Spivak, McClelland, Maier & Neustadt, P.C.

(57) ABSTRACT

The present invention provides a spooler that adequately manages and controls print jobs, which require establishment of mutual communication, with relieved loading. In the arrangement of the present invention, a buffer is provided corresponding to each printer PRT connected to a network LAN to successively spool print jobs transferred from clients. In the case of a conventional print job, a print queue and whole print data are spooled in the buffer. In the case of an interactive print job that requires mutual communication between the client and the printer, only the print queue is stored in the buffer, while a wait signal is output to the client to wait for transmission of the print data of the print job. In order to carry out the interactive print job, printing is executed via a bypass that establishes the mutual communication not via the buffer but directly between a print job execution unit and the client.

12 Claims, 6 Drawing Sheets

PRINT JOB MANAGEMENT SYSTEM

BACKGROUND OF THE INVENTION

1. Field of the Invention

The present invention relates to a print job management system that receives a plurality of print jobs from a plurality of print data generating apparatuses, such as computers, manages the received print jobs, and causes at least one printer to adequately carry out printing operations corresponding to these print jobs.

2. Description of the Related Art

With the enhanced popularity of LANs (local area networks) and other similar networks, the typically adopted system connects a plurality of computers (hereinafter may be referred to as clients) and at least one printer via a network and enables the printer to be commonly used by the clients. The printer receives a plurality of print jobs transmitted from the respective clients. In order to process such print jobs, each printer has an internal or external spool buffer for stacking the print jobs. The print jobs are once stored in the spool buffer and are successively transferred for printing. The print jobs are managed by the software called the spooler and are in principle carried out in the storage sequence in the spool buffer. A client who has a predetermined right may change the execution sequence of the print jobs or delete a selected print job.

A recently developed system realizes the more intelligent management than the conventional spooler and has the function of accepting only the print jobs transmitted from a predetermined user who has obtained approval and the function of keeping input print jobs and carrying out a printing operation only when predetermined conditions, for example, a preset time, are fulfilled.

There are print jobs of two different types. One type of the print job enables the printer to carry out printing based on a predetermined format of data, for example, raster image, data, transmitted from the client. This type of print job is hereinafter referred to as the remote print job. The other type of the print job requires establishment of mutual communication between the client and the printer. This type of print job is hereinafter referred to as the interactive print job. One example of the interactive print job is a print job that describes the drawing contents to be printed not as raster image data but in PostScript (registered trademark) language. The PostScript language is an interpreter program language. The printer consecutively repeats reading, interpreting, and executing commands to implement printing. In this process, various pieces of information, such as version information of the PostScript language and a font list supported by the printer, are transmitted between the printer and the client.

In the prior art system, when an interactive print job is transmitted from the client, the spooler functions as the printer and accepts the print job while the mutual communication is established between the spooler and the client. When the execution sequence reaches the print job, the spooler then functions as the client and executes the print job while the mutual communication is established between the spooler and the printer. In order to attain such functions, the spooler that manages the interactive print jobs is forced to carry out extremely complicated processing. Such heavy loading is a serious problem especially for the spooler incorporated in the printer, because of the relatively poor processing ability of the CPU. The quasi mutual communication between the client and the printer attained by the double roles of the spooler may not sufficiently support the required functions. It is extremely difficult for the prior art spooler to carry out advanced management of interactive print jobs, for example, keeping the print jobs and transferring the input print job to another printer.

Similar problems to those described above with regard to the network printing system are found in a local printer connected locally to a specific printer. In the case where a plurality of print jobs transmitted to the local printer and subjected to management include an interactive print job, the similar problems arise.

SUMMARY OF THE INVENTION

The object of the present invention is thus to provide a technique that adequately manages and controls interactive print jobs with relieved loading in a print job management system applied for both the network printing system and the local printer.

At least part of the above and the other related objects is attained by a print job management apparatus that stores a plurality of print jobs sent from at least one print data generating apparatus into a buffer and causes a printer to adequately carry out printing operations corresponding to the plurality of print jobs. The print jobs may include at least one interactive print job on the premise that mutual communication is established between the print data generating apparatus and the printer. The print job management apparatus includes: a job form decision unit that determines whether or not each print job of interest among the plurality of print jobs is the interactive print job; an interactive print job input unit that, when the print job of interest is the interactive print job, stacks only predetermined data being set intrinsically to the interactive print job in a specific form that does not represent all drawing details of the print job; and an interactive print job execution unit that establishes mutual communication between the print data generating apparatus and the printer and carries out printing at a specific timing determined by stacking condition of the predetermined data. The stacking condition in the buffer recognizes the specific timing when the interactive print job is to be carried out.

The print data generating apparatus represents any of various apparatuses that generate image data to be printed, for example, personal computers, facsimiles, and digital cameras. The print job management apparatus of the present invention is applicable for both a local system and a network printing system. In the former system, the print data generating apparatus is locally connected to the printer. In the latter system, the print data generating apparatus is connected to the printer via a network.

The prior art system stores the whole print jobs in the buffer. In the present invention, however, only the predetermined data, which specifies transmission of a print job of interest to the buffer, is stored in the buffer. The print job management apparatus utilizes the predetermined data to attain the advanced management and control of the interactive print jobs as well as the remote print jobs, for example, managing the execution sequence of printing, changing the execution sequence, and deleting a selected print job. The establishment of mutual communication is not required in the process of storing the predetermined data. This arrangement desirably relives the loading at the time of accepting the print job. In the course of executing the interactive print job, mutual communication is established between the printer and the client. This further relieves the loading at the time of execution. This arrangement also ensures the functions depending upon the mutual communication.

As described above, the print job management apparatus of the present invention is applicable to the local system but is more effectively applied to the network printing system where the print data generating apparatus is connected with the printer via the network. The network printing system generally has the higher necessity for print job management than the local system where the print data generating apparatus basically has the one-to-one connection with the printer.

In accordance with one preferable application of the print job management apparatus of the present invention, the predetermined data set intrinsically in the interactive print job input unit is job information data, which includes at least information specifying that the print job of interest is the interactive print job and information specifying a print data generating apparatus that has transmitted the print job of interest.

Here the predetermined data set intrinsically may be any data having a data form that at least specifies that the print job of interest is the interactive print job. The 'specific form that does not represent all drawing details of the print job' means exclusion of the form that receives the whole drawing details of the print job. The predetermined data may thus be part of print data that does not require the mutual communication, for example, a head part of packet data representing a print job. This corresponds to an application that discontinues the transmission of the print job at the time when the print job of interest is recognized as the interactive print job. At the time of executing the print job, the system resumes receiving a subsequent part of the packet data following the head part, which has already been received.

In the print job management apparatus of the present invention that carries out management and control of the interactive print job without receiving the whole print job, the print job input unit outputs a specific interruption signal to a print data generating apparatus, which is transmitting the print job of interest, to discontinue the transmission of the print job when it is determined that the print job of interest is the interactive print job.

In the print job management apparatus of the present invention, the interactive print job execution unit may indirectly establish the mutual communication via the buffer. The more preferable application causes the interactive print job execution unit to carry out printing not via the buffer. This arrangement further relieves the loading applied to the print job management apparatus while directly relieving the mutual communication. A diversity of procedures may be applied to attain the function of carrying out the printing operation not via the buffer: the procedure of skipping the process of storing the input print jobs into the buffer in the print job management apparatus, the procedure of transferring the input packet data without any processing; and the procedure of outputting address information to the print data generating apparatus in order to transmit he print job not via the print job management apparatus and thereby changing the destination of transmission of the print job.

The print job management apparatus of the present invention is especially effective when being incorporated in the printer. In such cases, the buffer and the print job management apparatus generally have a relatively poor processing ability. When the print job management apparatus is incorporated in the printer, it is very easy to establish mutual communication in the case of executing the interactive print job. The print job management apparatus of the present invention is thus readily adopted in such a structure. The print job management apparatus of the present invention is, however, not restricted to the structure of being incorporated in the printer but may be constructed as a sever that is connected with the print data generating apparatus and the printer via the network.

A variety of arrangements may be applied for the job form decision unit that determines whether or not the print job of interest is the interactive print job. In the case of the print job management apparatus applied for the network printing system, for example, the job form decision unit carries out the determination, based on a communication protocol specified when the print job of interest is transmitted as packet data via the network. This is because the interactive print jobs are generally transmitted on a specific communication protocol that is suitable for the establishment of mutual communication in the course of printing, among a diversity of communication protocols.

The specific communication protocol may be AppleTalk. A typical example of the interactive print job is a print job described in the PostScript language. This specific print job is generally transmitted on AppleTalk.

In accordance with another preferable application, the job form decision unit carries out the determination, based on a header included in the interactive print job. For example, the print job described in the PostScript language generally has a head comment of '% !PS-Adobe . . . ' as the header. The type of the print job may thus be specified, based on the presence or absence of this head comment. This method of determination is applicable to the print job management apparatus that works either in the network printing system or in the local system.

One example of the interactive print job is data that specifies a target image to be printed in a page description language, which can be interpreted and executed by the printer, for example, in the PostScript language. The interactive print job is, however, not restricted to such data.

The technique of the present invention is attained by a variety of different applications other than the print job management apparatus discussed above, for example, a method of managing print jobs, a recording medium in which a program for managing print jobs is recorded, and the program itself. Typical examples of the recording medium include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

These and other objects, features, aspects, and advantages of the present invention will become more apparent from the following detailed description of the preferred embodiments with the accompanying drawings.

DESCRIPTION OF THE PREFERRED EMBODIMENTS

Some modes of carrying out the present invention are described below as preferred embodiments in the following sequence:

A. Structure of System
B. First Embodiment
C. Print job Stack Process Routine
D. Modifications of Print job Stack Process Routine
E. Print job Execution Process Routine
F. Second Embodiment

A. Structure of System

Figure 1:
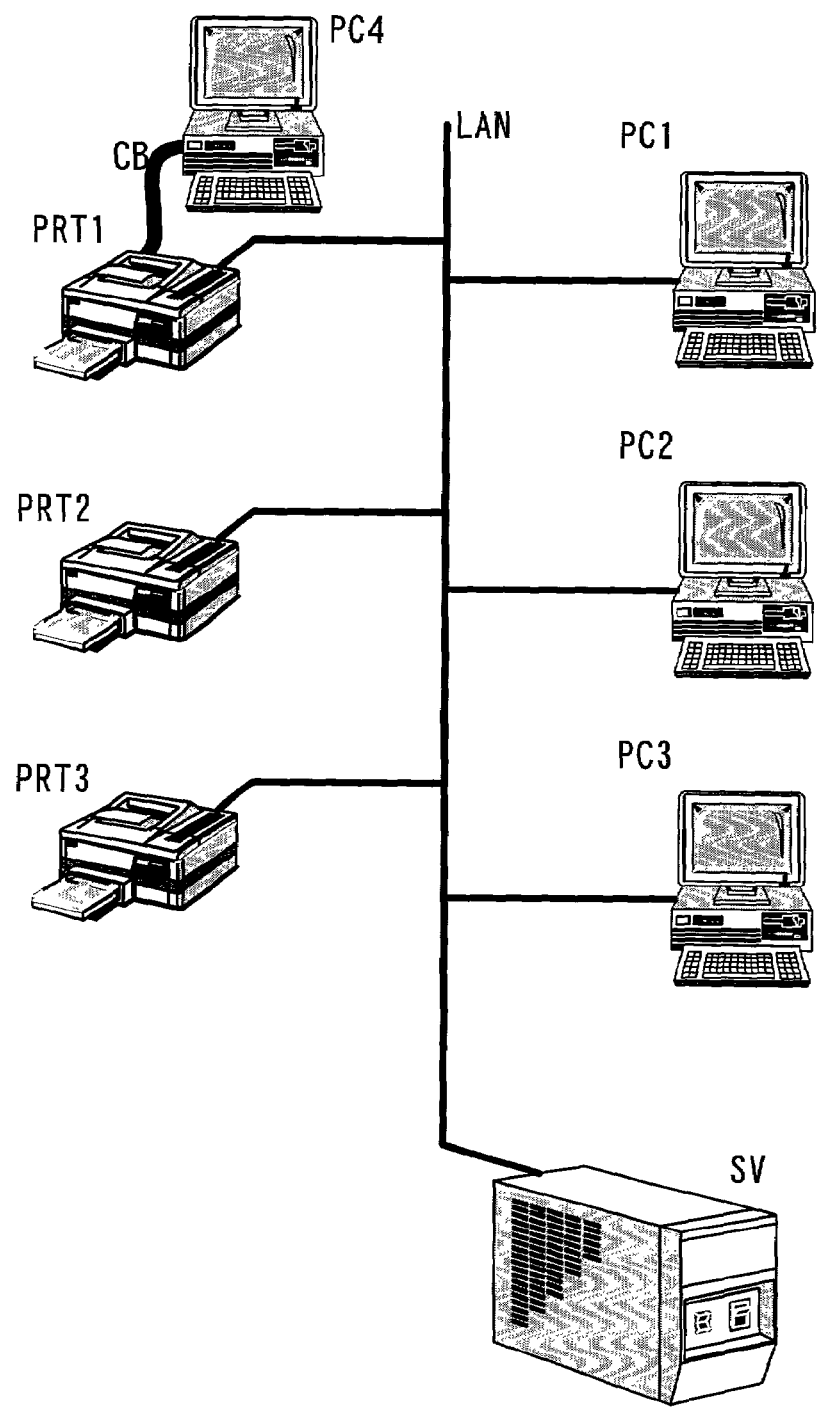
FIG. 1 schematically shows the structure of a printing system via a network.

FIG. 1 schematically shows the structure of a printing system via a network. Three client computers PC1, PC2, and PC3 (hereinafter may be generally referred to as the clients) and printers PR1, PR2, and PR3 are connected to a local area network LAN. A server SV is also connected to the network LAN. Independently of the connection via the network, another computer PC4 is locally linked with the printer PRT1. A diversity of interfaces may be applicable for the connection between the computer PC4 and the printer PRT1. A parallel interface in conformity with the IEEE1284 standard is adopted in the embodiments.

Each user of the client computers PC1, PC2, and PC3 specifies one of passes, which respectively correspond to the printers PR1, PR2, and PR3, transmits a required print job, and causes a desired printer to carry out a printing operation corresponding to the transmitted print job. The printers PR1, PR2, and PR3 are network printers and more specifically laser printers in the embodiments. The user of the computer PC4 outputs a required print job to the printer PRT1 and causes the printer PRT1 to carry out a printing operation corresponding to the required print job.

Each of the print jobs sent from the respective clients is once stored in a spool (simultaneous peripheral operation online) buffer provided corresponding to a specified printer and is subjected to the printing operation by the specified printer. The print job management apparatus has the functions of storing the print jobs sent to each printer in the corresponding spool buffer and causing the printer to adequately carry out printing operations corresponding to the print jobs. In the embodiments, the main functions of the print job management apparatus are attained by the software configuration. The following describes a first embodiment, where the print job management apparatus is incorporated in each of the printers PRT1, PRT2, and PRT3. The subsequent description regards a second embodiment, where the print job management apparatus is provided in the server SV separate from the printers.

B. First Embodiment

Figure 2:
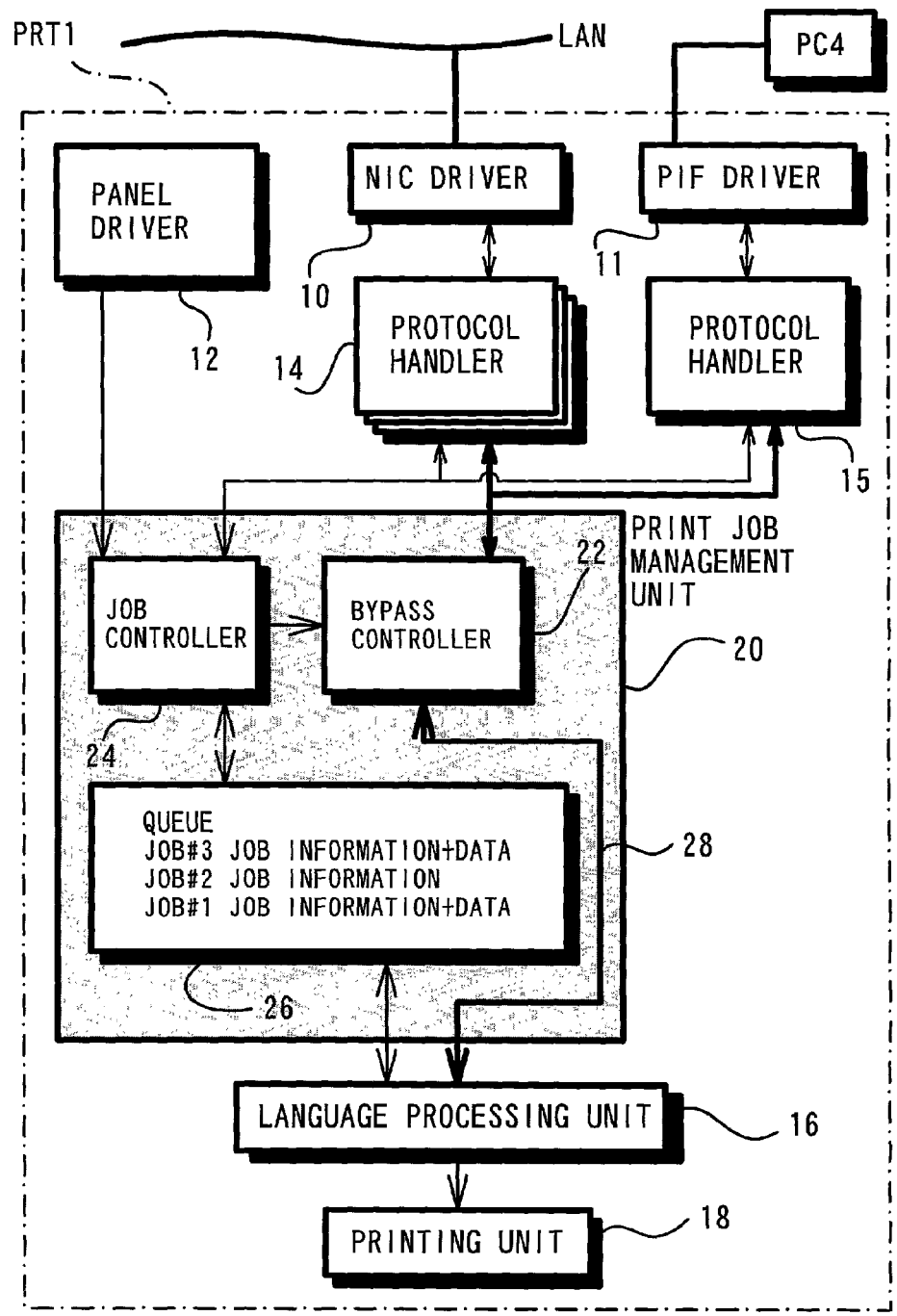
FIG. 2 shows functional blocks included in each of printers in a first embodiment of the present invention.

FIG. 2 shows functional blocks included in each of the printers in the first embodiment. Although the illustration of FIG. 2 refers to only the printer PRT1, the other printers PRT2 and PRT3 have the identical structure. The printer has a microcomputer including a CPU and memories like a RAM and a ROM. The respective functional blocks discussed below are attained by the software working on this microcomputer, unless otherwise specified.

The printer PRT1 includes a network interface card (NIC) as a hardware component, which is used to transmit data to and from the network LAN. An NIC driver 10 is the software to drive the network interface card NIC and enable data transmission to and from the network LAN. Data transmission to and from the network LAN, for example, transmission of print jobs, is performed via the NIC and the NIC driver 10.

The print jobs transmitted from the network LAN via the NIC driver 10 are packet data based upon a predetermined communication protocol. A protocol handler 14 analyzes the packet data according to the communication protocol, takes main data of the print jobs out of the packet data, and sends the main data to a print job management unit 20.

Figure 3:
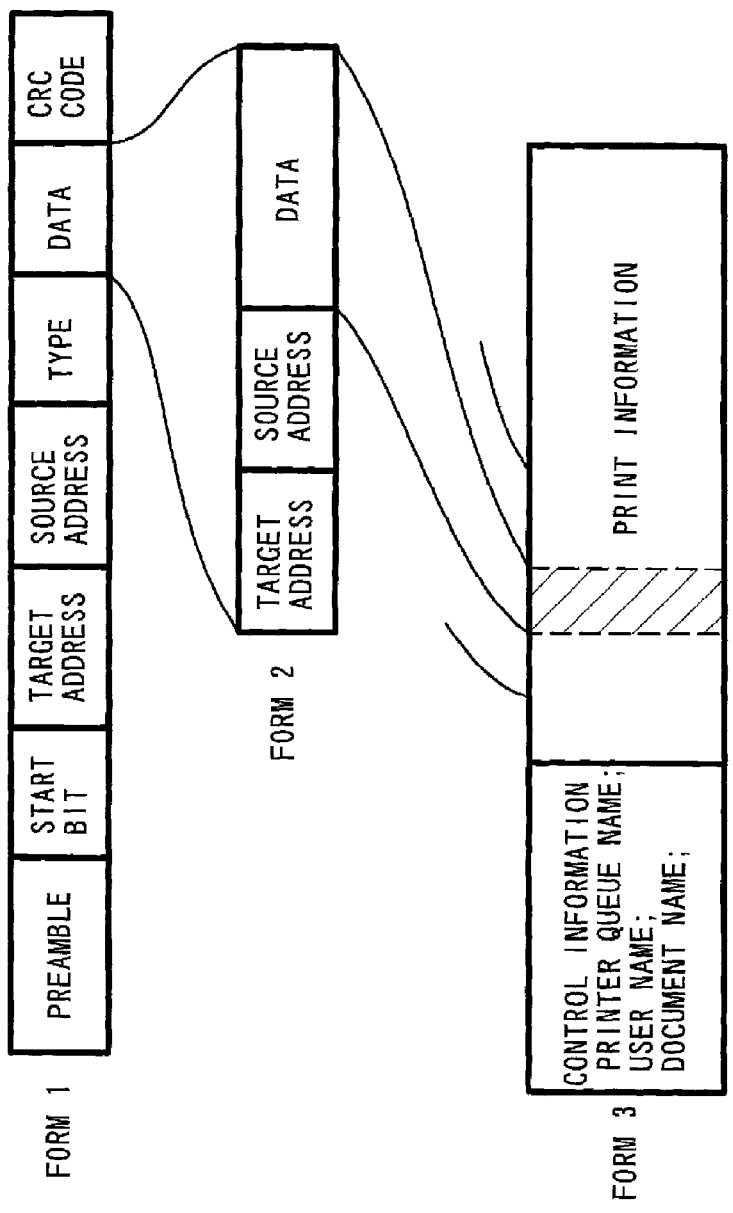
FIG. 3 shows a series of analysis of input packet data by a protocol handler in the structure of the first embodiment.

FIG. 3 shows a series of analysis of the input packet data by the protocol handler 14. Form 1 schematically shows the contents of the packet data input into the NIC driver 10. The packet data transmitted over the network LAN includes bit sequences according to a preset normalized format. A target address and a source address included in the form 1 are data generally called media access control (MAC) addresses and are intrinsic to the network interface card NIC. 'Type' data represents the type of the communication protocol. Namely the bit sequence of the 'type' data specifies the type of the communication protocol, such as TCP/IP or AppleTalk, on which the data of the form 1 are based.

The protocol handler 14 specifies the communication protocol based on the 'type' data included in the packet data of the form 1, and analyzes the contents of the packet data according to the rules of the specified communication protocol. Form 2 in FIG. 3 shows the results of the analysis. For example, when TCP/IP is selected for the communication protocol, the results of the analysis give a target address, a source address, and data shown in the form 2. The target address and the source address are data generally called IP addresses. The process of analyzing a plurality of packet data and collecting the results of the analysis gives print job data shown as form 3. The structure of the print job data depends upon the print protocol used in the printer. The form 3 shows the data structure following a print protocol LPR. In the case of a print job described in the PostScript language, the print job is constructed as an interpreter program code. In this embodiment, a plurality of protocol handlers 14 are provided to respectively handle a diversity of protocols applicable for communication. Alternatively only one protocol handler 14 may be provided to handle only a single protocol.

Referring back to FIG. 2, the functional blocks of the printer are further described. The data analyzed by the protocol handler 14 are successively transferred to the print job management unit 20. The print job management unit 20 includes a buffer for storing the input print jobs therein, that is, a queue 26. The transferred data are classified by the type of the print job and stored in the queue 26 under the control of a job controller 24. In this embodiment, the information stored in the queue 26 depends upon the type of the print job. In the case of a remote print job, both job information data, which represents a request for printing, and main data of the print job are stored in the queue 26. In the case where the print job is an interactive print job that requires establishment of mutual communication between the printer and the client, on the other hand, only the job information data is stored in the queue 26. In the example of FIG. 2, first through third print jobs #1, #2, and #3 are stored in the queue 26. The print jobs #1 and #3 are the remote print jobs, so that both the job information data and print data representing the details of drawing are stored in the queue 26. The print job #2 is the interactive print job, so that only the job information data is stored in the queue 26. The technique of this embodiment detects the requirement for mutual communication in the case of print jobs described in the PostScript language and carries out the processing to store only the job information data.

The job controller 24 is in charge of such control procedure. The job controller 24 refers to the results of the analysis carried out by the protocol handler 14, determines whether or not the print job of interest is the interactive print job, and changes the storage into the queue 26 based on the result of the determination. In the case where the print job of interest is an interactive print job, the main data of the print job is not stored in the queue 26. The job controller 24 outputs a wait signal to the client, which has transmitted the print job of interest, to wait for transmission of the main data of the print job. The signal is transferred to the client via the NIC driver 10 according to the predetermined communication protocol.

The job controller 24 carries out management of the print jobs, for example, changing the execution order of the print jobs stored in the queue 26 and deleting a selected print job, in addition to the control in the course of storing the print jobs into the queue 26. Such management may be carried out in response to commands transmitted from the client via the network or in response to operations of a panel provided on the printer. The printer has a panel driver 12 to input the panel operations performed by the user and transfer the panel operations to the print job management unit 20. In the latter case, the print job management unit 20 carries out management of the print jobs, based on the information transferred from the panel driver 12.

The job controller 24 also has the function of causing the print jobs stored in the queue 26 to be executed successively. The print jobs stored in the queue 26 are sequentially transmitted to a language processing unit 16. The language processing unit 16 analyzes the data of each transmitted print job and generates a predetermined control signal. A printing unit 18 is actuated in response to the control signal to actually carry out printing. In the case of the remote print jobs like the jobs #1 and #3 shown in the example of FIG. 2, the main data of the print jobs are successively transferred from the queue 26 to the language processing unit 16 for printing.

In the case of the interactive print jobs like the job #2, on the other hand, since the main data of the print jobs are not stored in the queue 26, printing is carried out according to the following procedure. The print job management unit 20 has a bypass controller 22 as illustrated in FIG. 2. The job controller 24 activates the bypass controller 22 at the time of execution of the interactive print job and entrusts the control relating to the execution of the print job to the bypass controller 22. The activated bypass controller 22 receives data from the protocol handler 14 and transmits the data to the language processing unit 16 not via the queue 26 but directly. As shown by the bolded arrows, a bypass 28 is made between the protocol handler 14 and the language processing unit 16 by the software configuration, in order to allow data transmission not via the queue 26 but directly. The bypass controller 22 outputs an enable signal to allow transmission of interactive print jobs to the client, which has waited for transmission of the interactive print jobs, simultaneously with the formation of the bypass 28. Printing is then carried out under the mutual communication between the client and the language processing unit 16 of the printer.

The computer PC4 is locally connected to the printer PRT1 as mentioned previously. The computer PC4 transmits print jobs not via the network LAN but via a parallel interface (PIF). The printer PRT1 accordingly has a mechanism for receiving print jobs via the parallel interface. As shown in FIG. 2, a PIF driver 11 receives the print jobs transmitted from the computer PC4. The PIF driver 11 is the software for driving the parallel interface. The data received by the PIF driver 11 are transmitted to another protocol handler 15, which analyzes the transmitted data and restores them to the data of the print jobs. The functions of the protocol handler 15 are substantially equivalent to those of the protocol handler 14 that analyzes the communication protocol for the network. The difference is that the protocol handled by the protocol handler 15 is specified for parallel communication. The data analyzed by the protocol handler 15 are stored into the queue 26 under the control of the job controller 24 and are subjected to printing operations. The job controller 24 arbitrates the transmission of data between the protocol handlers 14 and 15, so as to adequately receive both the data from the network and the data from the parallel interface.

In the printer PRT1 of this embodiment constructed as discussed above, the print job management unit 20 manages the print jobs transmitted via the network or locally and causes printing operations to be adequately carried out. The arrangement of the embodiment changes the process of stacking the print job into the queue 26 and the process of executing the print job between the remote print jobs and the interactive print jobs. The following describes the details of the control procedure to change the method of stacking the print job into the queue 26 and the method of executing the print job by the type of the print job.

C. Print Job Stack Process Routine

The CPU executes a print job stack process discussed below to attain the control in the course of storing the print jobs received by the print job management unit 20 into the queue 26. The following description regards a series of processing that determines whether or not a print job of interest is an interactive print job based on the communication protocol.

Figure 4:
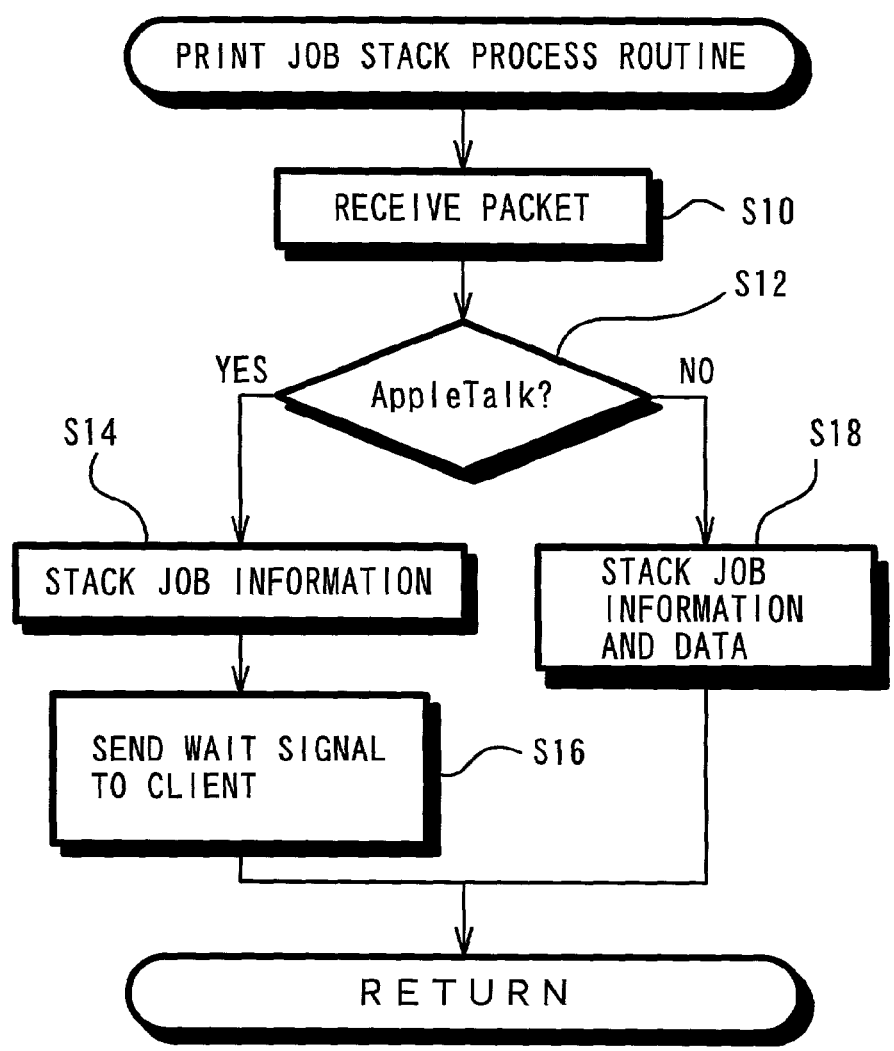
FIG. 4 is a flowchart showing a print job stack process routine.

FIG. 4 is a flowchart showing a print job stack process routine. When the program enters this routine, the CPU first receives packet data from the network at step S10 and analyzes the contents of the packet data according to the forms shown in FIG. 3. The CPU then determines whether or not the communication protocol is AppleTalk, based on the 'type' data (see FIG. 3) obtained by the analysis at step S12. In this embodiment, the print jobs described in the PostScript language are regarded as interactive print jobs. Such interactive print jobs are generally transmitted according to the communication protocol AppleTalk. Other communication protocols like TCP/IP are typically used for remote print jobs. The processing of this embodiment takes into account these facts and determines that the print job of interest is an interactive print job in the case where the communication protocol applied is AppleTalk.

When it is determined at step S12 that the communication protocol is AppleTalk, only the job information data is stacked into the queue 26 at step S14. The CPU simultaneously outputs a wait signal to the client to wait for transmission of the print job at step S16. The job information data includes a comment specifying that the print job of interest is described in the PostScript language and an address of the client, which has transmitted the print job of interest. The address of the client is included in the received packet data as the source address as shown in FIG. 3. The wait signal is not necessarily a special signal characteristic of this embodiment but may be data that informs the client of the unreceivable state of the printer according to the protocol on the network.

When it is determined at step S12 that the communication protocol is other than AppleTalk, on the other hand, the CPU determines that the print job of interest is not the print job described in the PostScript language but a remote print job and stacks both the job information data and the successively transferred print data into the queue 26 at step S18. The above series of processing adequately manages the information stacked into the queue 26 in different manners for the interactive print jobs and for the other print jobs. In the structure of this embodiment, the print jobs transmitted from the locally connected computer PC4 follow a different protocol from AppleTalk and are thus regarded as the remote print jobs. Another possible procedure modifies the processing of step S12 and determines that the print job of interest transmitted from the locally connected computer PC is an interactive print job in the case where the print job of interest follows a predetermined protocol.

D. Modifications of Print Job Stack Process Routine

The procedure of the embodiment determines whether or not the print job of interest is a print job described in the PostScript language, based on the communication protocol. One modified procedure may determine whether or not the print job of interest is an interactive print job, based on the contents of the print data. For example, the print job described in the PostScript language generally has a specific comment '%!PS-Adobe . . . ' on the head thereof. This modified procedure determines whether or not the print job of interest is a print job described in the PostScript language, based on the presence of such specific comment, instead of based on the type of the communication protocol, by the processing of step S12.

In the above embodiment, the print job described in the PostScript language is mentioned as an example of the interactive print jobs. The print job stack process discussed above is applicable to a variety of print jobs as well as to the print jobs described in the PostScript language. In the case where the interactive print job of interest, which is an object of the processing, follows a specific communication protocol, the determination of the interactive print job is based on the type of the communication protocol in the same manner as discussed in the embodiment. In the case where the interactive print job of interest has a specific comment or any intrinsic data format, the determination of the interactive print job is based on the specific comment or the intrinsic data format. The determination may be based on an adequate combination of the protocol, the data format, and the contents of the data.

The procedure of the above embodiment stacks only the job information data in the case of the interactive print jobs. Another modified procedure may stack part of the print data, which does not require the mutual communication, in addition to the job information data.

E. Print Job Execution Process Routine

Figure 5:
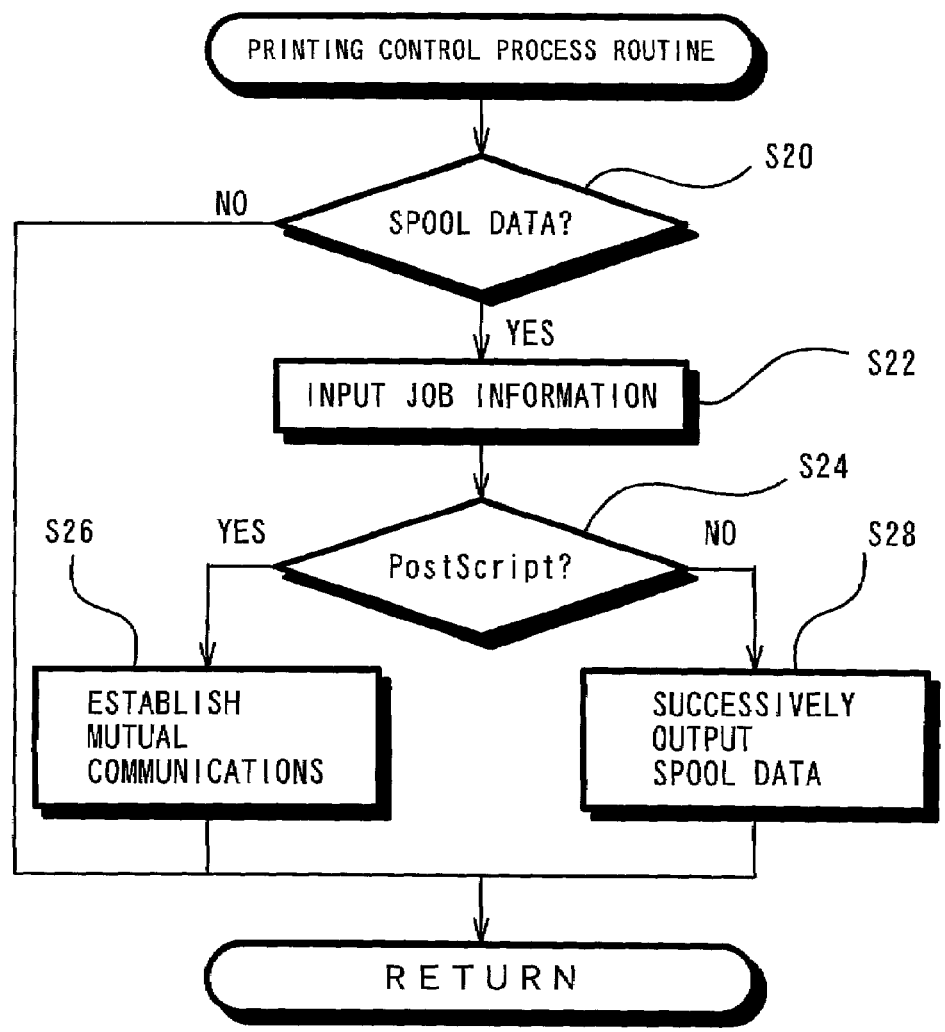
FIG. 5 is a flowchart showing a print control process routine.

The following describes a control procedure for executing the print job stacked in the queue 26. FIG. 5 is a flowchart showing a print control process routine, which is carried out by the CPU in the printer. The CPU refers to the queue 26 and determines whether or not there is any spool data or any print job stacked therein at step S20. When there is not spool data, the printing operation is not required. The program thus immediately exits from this routine without any further processing.

When there is any spool data in the queue 26, on the other hand, the CPU inputs the job information data of a print job of interest, which is to be executed next, at step S22 and determines whether or not the print job of interest is a print job described in the PostScript language at step S24. As discussed above with the flowchart of FIG. 4, the job information data includes the specific information that enables identification of the print job described in the PostScript language. The determination of step S24 is accordingly based on the job information data.

As long as it is determined whether or not the print job of interest is an interactive print job, the determination may not be based on the job information data. In the case of the interactive print job, no print data is stored in the queue 26. The determination may thus be based on the presence or the absence of the print data. In the arrangement that stacks part of the print data into the queue 26, the procedure determines whether or not the print job of interest is an interactive print job, based on the format of the print data stacked in the queue 26.

When it is determined at step S24 that the print job of interest is not a print job described in the PostScript language but a remote print job, the CPU consecutively reads the spool data stored in the queue 26 and transfers the spool data to another routine that actually executes printing at step S28. When it is determined at step S24 that the print job of interest is a print job described in the PostScript language, on the other hand, the CPU carries out the processing to establish the mutual communication for printing at step S26. The processing of step S26 in this series of control process corresponds to the functions of the bypass controller 22 shown in FIG. 2. By the processing of step S26, the print data successively received is not subjected to the process of stacking into the queue 26 (see FIG. 4) but is directly transferred to the routine that actually executes printing (that is, the routine corresponding to the language processing unit 18 shown in FIG. 2). In an alternative arrangement, such print data may be temporarily stacked in the queue 26 for convenience. The printer includes a separate interpreter for interpreting and executing the jobs described the PostScript language. The required processing at step S26 sets the environment to enable mutual transmission of data between the interpreter and the client.

The print job management apparatus of the first embodiment described above enables the print jobs described in the PostScript language and other interactive print jobs to be subjected to printing via spool into the queue 26. As in the case of the remote print jobs, this arrangement ensures the easy management of the interactive print jobs including change of the execution order of print jobs, deletion of print jobs, and storage of print jobs. In the case of the interactive print jobs, the arrangement of the embodiment causes the client to wait for transmission of a print job until the execution timing of the print job, in order to attain the management. This advantageously relieves the processing load required for the CPU at the time of receiving and executing the print job. In the case of the interactive print jobs, only the job information data is stacked in the queue 26. Another advantage of this arrangement is thus to facilitate the highly-advanced management, for example, transfer of a print job that has once been received by one printer PRT1 to another printer.

F. Second Embodiment

Figure 6:
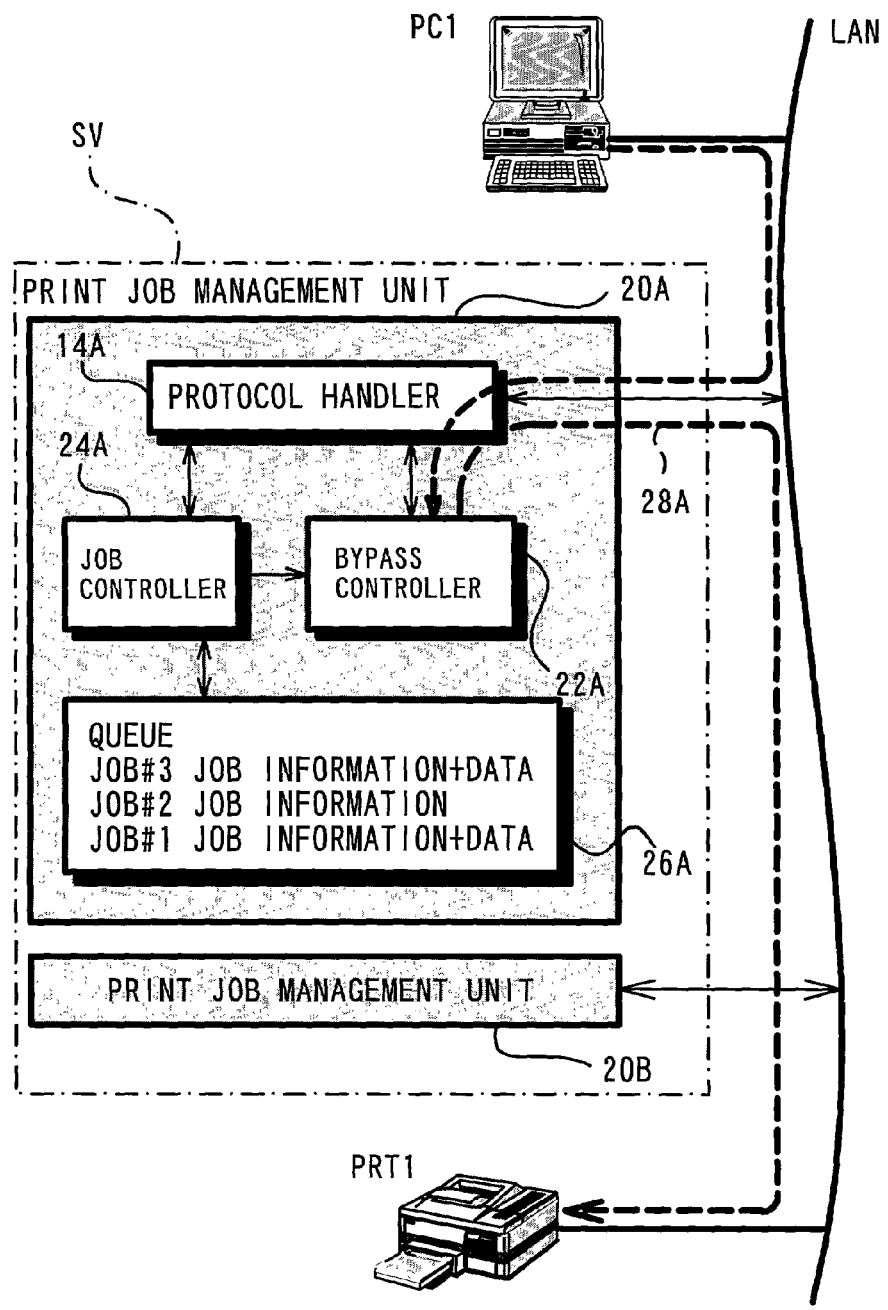
FIG. 6 schematically illustrates the structure of another print job management apparatus in a second embodiment of the present invention.

FIG. 6 schematically illustrates the structure of another print job management apparatus in a second embodiment of the present invention. The first embodiment regards the print job management apparatus that is incorporated in each printer and includes the print job management unit and the spool buffer. The second embodiment regards the print job management apparatus that is incorporated in the server SV separate from the printers. The structure and the functions of a print job management unit 20A in the second embodiment are similar to those of the print job management unit 20 in the first embodiment. The print job management unit 20A includes a job controller 24A, a protocol handler 14A, and a queue 26A. The print job management unit 20A analyzes packet data received via the protocol handler 14A under the control of the job controller 24A and successively stacks the print jobs into the queue 26A. The job controller 24A consecutively carries out the print jobs stacked in the queue 26A. The NIC driver is omitted from the illustration.

The print job management unit is provided corresponding to each printer. For example, the print job management unit 20A is provided corresponding to the printer PRT1, and another print job management unit 20B having the identical structure with that of the print job management unit 20A is provided corresponding to another printer PRT2. In the second embodiment, the print job management units are constructed by the software configuration, so that the respective print job management units utilize the common hardware resource.

Like the first embodiment, the contents of the data stacked in the queue 26 depend upon whether or not the print job of interest is an interactive print job in the structure of the second embodiment. The second embodiment adopts the print job stack process routine of the first embodiment shown in the flowchart of FIG. 4 to control the stacking of print jobs. A variety of modifications described in the first embodiment are also applicable for the structure of the second embodiment.

The print control process routine of the first embodiment shown in the flowchart of FIG. 5 is also applied for the second embodiment to execute the print job. The only difference from the first embodiment is the destination of transmitting the print jobs. In the structure of the first embodiment, the print job management unit is incorporated in each printer. In the structure of the second embodiment, however, the print job management unit is separate from the printer that actually carries out printing. In the case of executing a remote print job (step S28 in the flowchart of FIG. 5), the job controller 24A successively transfers the data of the print job stacked in the queue 26A to the printer PRT1 according to a predetermined communication protocol. The printer PRT1 consecutively carries out printing, based on the transferred data.

As discussed in the first embodiment, in the case of the interactive print jobs, the job controller 24A entrusts the control for executing the job to the bypass controller 22A. Namely the printing operation is carried out while the mutual communication is established between the client PC1 and the printer PRT1. The broken lines in FIG. 6 represent the pathway of transferring print jobs in the active state of the bypass controller 22A, that is, a bypass 28A. The bypass controller 22A receives print jobs output from the client PC1 to the print job management unit 20A and directly transfers the print jobs to the printer PRT1 without stacking in the queue 26A. This procedure corresponds to the processing of step S26 in the first embodiment.

The mutual communication may be established by changing the destination of transmission of the print job, which are output from the client PC1, from the print job management unit 20A to the printer PRT1. In this case, the bypass controller 22A functions to output a specific command to the client PC1 to change the destination of transmission of the print job to the printer PRT1 at the execution timing of an interactive print job. In accordance with a preferable arrangement, the bypass controller 22A causes either the printer PRT1 or the client PC1 to output a signal informing the end of the print job to the print job management unit 20A on completion of the execution of each interactive print job.

Like the first embodiment, the print job management apparatus of the second embodiment described above readily attains the execution of printing that takes advantage of the spool function with regard to all the print jobs including the interactive print jobs. The arrangement of the second embodiment also ensures the adequate management and control of print jobs with relieved load.

In the first and the second embodiments discussed above, the print job management unit is constructed by the software. The technique of the present invention can thus be attained by a recording medium in which such software is recorded. The software is installed in the server SV or the printer via a recording medium, such as a flexible disk, or via the network to actualize the print job management apparatus of the present invention. The print job management apparatus may alternatively be actualized by the hardware construction. In the embodiments discussed above, the interactive print jobs are transmitted via the network. The technique of the present invention is, however, also applicable for management of the print jobs in the structure where interactive print jobs are transmitted from any locally connected computer and in the structure where a plurality of computers are locally connected to one printer.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The scope and spirit of the present invention are indicated by the appended claims, rather than by the foregoing description.

What is claimed is:

1. A print job management apparatus that stores a plurality of print jobs sent from at least one print data generating apparatus into a buffer and causes a printer to adequately carry out printing operations corresponding to the plurality of print jobs, said print jobs including a non-interactive print job and an interactive print job that needs mutual communication established between said print data generating apparatus and said printer, said print job management apparatus comprising:
    a job form decision unit configured to determine whether each print job of interest among the plurality of print jobs is said interactive print job or the non-interactive print job;
    a print job input unit that stacks interactive print job data and non-interactive print job data into the buffer, the interactive print job data consisting of a predetermined type of data in a specific form without representing all drawing details of the print job, the non-interactive print job data including print data representing all drawing details of the print job;

an interactive print job execution unit configured to establish mutual communication between said print data generating apparatus and said printer to carry out interactive printing at a specific timing determined by stacking condition of said predetermined type of data in the buffer; and a non-interactive print job execution unit configured to carry out non-interactive printing at a specific timing determined by stacking condition of the non-interactive print job data in the buffer by transmitting the non-interactive print data to said printer without establishing mutual communication between said print data generating apparatus and said printer.

2. A print job management apparatus in accordance with claim 1, wherein said print data generating apparatus is connected with said printer via a network.

3. A print job management apparatus in accordance with claim 1, wherein the predetermined type of data set in said interactive print job input unit is job information data, which includes at least information specifying that the print job of interest is the interactive print job and information specifying a print data generating apparatus that has transmitted the print job of interest.

4. A print job management apparatus in accordance with claim 1, wherein said print job input unit outputs a specific interruption signal to a print data generating apparatus, which is transmitting the print job of interest, to discontinue the transmission of the print job when it is determined that the print job of interest is the interactive print job.

5. A print job management apparatus in accordance with claim 1, wherein said interactive print job execution unit carries out printing not via said buffer.

6. A print job management apparatus in accordance with claim 1, said print job management apparatus being incorporated in said printer.

7. A print job management apparatus in accordance with claim 2, wherein said job form decision unit carries out the determination, based on a communication protocol specified when the print job of interest is transmitted as packet data via a network.

8. A print job management apparatus in accordance with claim 7, wherein said job form decision unit determines that the print job of interest is the interactive print job when the communication protocol specified is AppleTalk.

9. A print job management apparatus in accordance with claim 1, wherein the interactive print job is data that specifies a target image to be printed in a page description language, which can be interpreted and executed by said printer.

10. A print job management apparatus in accordance with claim 1, wherein the interactive print job is data including a predetermined header, and said job form decision unit carries out the determination based on the predetermined header.

11. A method of managing print jobs in a system that stores a plurality of print jobs sent from at least one print data generating apparatus into a buffer and causes a printer to adequately carry out printing operations corresponding to the plurality of print jobs, said print jobs including a non-interactive print job and an interactive print job on the premise that mutual communication is established between said print data generating apparatus and said printer, said method comprising the steps of:

(a) determining whether each print job of interest among the plurality of print jobs is said interactive print job or the non-interactive print job;

(b) stacking interactive print job data and non-interactive print job data into the buffer, the interactive print job data consisting of a predetermined type of data in a specific form without representing all drawing details of the print job, the non-interactive print job data including print data representing all drawing details of the print job;

(c) establishing mutual communication between said print data generating apparatus and said printer to carry out interactive printing at a specific timing determined by stacking condition of the predetermined type of data in the buffer; and (d) carrying out non-interactive printing at a specific timing determined by stacking condition of the non-interactive print job data in the buffer by transmitting the non-interactive print data to said printer without establishing mutual communication between said print data generating apparatus and said printer.

12. A recording medium in which a specific program is recorded in a computer readable manner, said specific program making a plurality of print jobs sent from at least one print data generating apparatus stored into a buffer and causing a printer to adequately carry out printing operations corresponding to the plurality of print jobs, said print jobs including a non-interactive print job and an interactive print job on the premise that mutual communication is established between said print data generating apparatus and said printer, said specific program attaining the functions of:

determining whether each print job of interest among the plurality of print jobs is said interactive print job or the non-interactive print job;

stacking interactive print job data and non-interactive print job data into the buffer, the interactive print job data consisting of a predetermined type of data in a specific form without representing all drawing details of the print job, the non-interactive print job data including print data representing all drawing details of the print job;

establishing mutual communication between said print data generating apparatus and said printer to carry out interactive printing at a specific timing determined by stacking condition of the predetermined type of data in the buffer; and carrying out non-interactive printing at a specific timing determined by stacking condition of the non-interactive print job data in the buffer by transmitting the non-interactive print data to said printer without establishing mutual communication between said print data generating apparatus and said printer.

* * * * *